United States Patent
Jun

(10) Patent No.: US 11,785,320 B2
(45) Date of Patent: Oct. 10, 2023

(54) CAMERA MODULE AND PORTABLE TERMINAL HAVING THE SAME

(71) Applicant: Samsung Electro-Mechanics Co., Ltd., Suwon-si (KR)

(72) Inventor: Jae Woo Jun, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 172 days.

(21) Appl. No.: 17/176,578

(22) Filed: Feb. 16, 2021

(65) Prior Publication Data

US 2022/0030141 A1   Jan. 27, 2022

(30) Foreign Application Priority Data

Jul. 24, 2020   (KR) .................. 10-2020-0092207

(51) Int. Cl.
| H04N 23/55 | (2023.01) |
|---|---|
| H04N 23/15 | (2023.01) |
| G02B 13/00 | (2006.01) |
| H04M 1/02 | (2006.01) |
| H04N 23/51 | (2023.01) |

(52) U.S. Cl.
CPC ......... *H04N 23/15* (2023.01); *G02B 13/0065* (2013.01); *H04M 1/0264* (2013.01); *H04N 23/51* (2023.01)

(58) Field of Classification Search
CPC .. H04N 5/2254; H04N 5/2252; H04N 5/2257; G02B 13/0065; G02B 7/1821; G02B 26/0816; H04M 1/0264
See application file for complete search history.

(56) References Cited

U.S. PATENT DOCUMENTS

| 2002/0197070 A1 | 12/2002 | Suzuki | |
|---|---|---|---|
| 2017/0052430 A1* | 2/2017 | Higashitsutsumi | .. G01B 11/303 |
| 2018/0035031 A1 | 2/2018 | Kwak et al. | |
| 2020/0132889 A1 | 4/2020 | Wippermann et al. | |
| 2021/0176397 A1* | 6/2021 | Müller | ............. H04N 23/69 |
| 2021/0286234 A1 | 9/2021 | Yeh et al. | |

FOREIGN PATENT DOCUMENTS

| CN | 201335933 Y | 10/2009 |
|---|---|---|
| CN | 103246134 A | 8/2013 |
| CN | 103744255 A | 4/2014 |
| CN | 104519265 A | 4/2015 |

(Continued)

OTHER PUBLICATIONS

Korean Office Action dated Apr. 27, 2021, in Counterpart Korean Patent Application No. 10-2020-0092207 (6 pages in English and 4 pages in Korean).

(Continued)

*Primary Examiner* — Mekonnen D Dagnew
(74) *Attorney, Agent, or Firm* — NSIP Law

(57) ABSTRACT

A camera module includes a lens module having a first optical path; an optical path converting component configured to reflect or refract light incident on a second optical path and a third optical path, intersecting the first optical path, to the lens module; a light-blocking member connected to the optical path converting component and configured to block light incident along the second optical path or the third optical path.

20 Claims, 19 Drawing Sheets

(56) References Cited

FOREIGN PATENT DOCUMENTS

| | | |
|---|---|---|
| CN | 107957650 A | 4/2018 |
| CN | 110892701 A | 3/2020 |
| DE | 20 2014 006 901 U1 | 12/2014 |
| JP | 2008-233762 A | 10/2008 |
| KR | 2003-0043873 A | 6/2003 |
| KR | 10-2005-0023687 A | 3/2005 |
| KR | 10-0484216 B1 | 4/2005 |
| KR | 10-2006-0106352 A | 10/2006 |
| KR | 10-2009-0077605 A | 7/2009 |
| KR | 10-1822743 B1 | 1/2018 |
| KR | 10-2018-0012688 A | 2/2018 |

OTHER PUBLICATIONS

Chinese Office Action dated Dec. 12, 2022, in counterpart Chinese Patent Application No. 202110670958.1 (9 Pages in Chinese, 7 Pages in English).

Chinese Office Action dated May 8, 2023, in counterpart Chinese Patent Application No. 202110670958.1 (4 pages in English, 7 pages in Chinese).

* cited by examiner

CAMERA MODULE AND PORTABLE TERMINAL HAVING THE SAME

CROSS-REFERENCE TO RELATED APPLICATIONS

This application claims the benefit under 35 USC 119(a) of Korean Patent Application No. 10-2020-0092207 filed on Jul. 24, 2020, in the Korean Intellectual Property Office, the entire disclosure of which is incorporated herein by reference for all purposes.

BACKGROUND

1. Field

The present disclosure relates to a camera module configured to capture an image of subjects located to the front and rear thereof and a portable terminal having the same.

2. Description of the Background

A camera module may be mounted on a portable terminal. For example, a camera module may be disposed on a front surface and/or a rear surface of the portable terminal to capture an image of subjects located to the front and rear of the portable terminal. As the camera module is configured to image only a subject located on one side of the portable terminal, a plurality of camera modules may be required to respectively image the front and rear of the portable terminal. Due to a small internal space of the portable terminal, however, it may be difficult to provide a plurality of camera modules.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module having a first optical path, an optical path converting component configured to reflect or refract light incident on a second optical path and a third optical path, intersecting the first optical path, to the lens module, and a light-blocking member connected to the optical path converting component and configured to block light incident along the second optical path or the third optical path.

The optical path converting component may be configured to rotate with respect to a point at which the first optical path and the second optical path or the first optical path and the third optical path intersect.

The light-blocking member may include a cylindrical body configured to be accommodated in the optical path converting component, the cylindrical body may be configured to rotate with respect to a point at which the first optical path and the second optical path intersect, and an opening enabling light traveling along the second optical path or the third optical path to be incident may be formed on a circumferential surface of the cylindrical body.

A circumferential length of the opening may be less than ½ of a circumferential length of the cylindrical body.

The light-blocking member may include a first light-blocking member connected to an end of the optical path converting component and configured to selectively block light incident along the second optical path, and a second light-blocking member connected to an other end of the optical path converting component and configured to selectively block light incident along the third optical path.

The optical path converting component may include an optical path converting member, and a support member for supporting the optical path converting member.

A groove extending in a length direction of the optical path converting member may be formed in the support member, and an extension unit formed to bind to the groove may be formed in the first and second light-blocking members.

The camera module may further include a housing for accommodating the lens module and the optical path converting component.

A guide groove for guiding a movement of the light-blocking member may be formed in the housing.

The camera module may further include a guide member inserted to the guide groove and guiding the movement of the light-blocking member.

A window exposed toward the second and third optical paths may be formed in the housing.

The camera module may further include a first driving member configured to drive the optical path converting component.

The camera module may further include a second driving member configured to move the lens module along the first optical path.

A portable terminal may include the camera module.

The second optical path may be incident to a front surface of the portable terminal and the third optical path may be incident to a rear surface of the portable terminal.

In another general aspect, a camera module includes a lens module having a first optical path, an optical path converting component rotatable to change direction of light incident on a second optical path and a third optical path to the first optical path of the lens module, and a light-blocking member connected to the optical path converting component to selectively block the light incident on the second optical path and the third optical path in response to rotation of the optical path converting component.

The light-blocking member may rotate with the optical path converting component.

The light-blocking member may slide linearly with the rotation of the optical path converting component.

In another general aspect, a portable terminal includes a front surface and a rear surface, a lens module disposed between the front surface and the rear surface and having an optical path, an optical path converting component configured to rotate to change direction of light incident to the front surface and light incident to the rear surface to the optical path of the lens module, and a light-blocking member connected to the optical path converting component to selectively block the light incident to the front surface and the light incident to the rear surface.

The light-blocking member may slide linearly or rotate with the rotation of the optical path converting component to selectively block the light incident to the front surface and the light incident to the rear surface.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
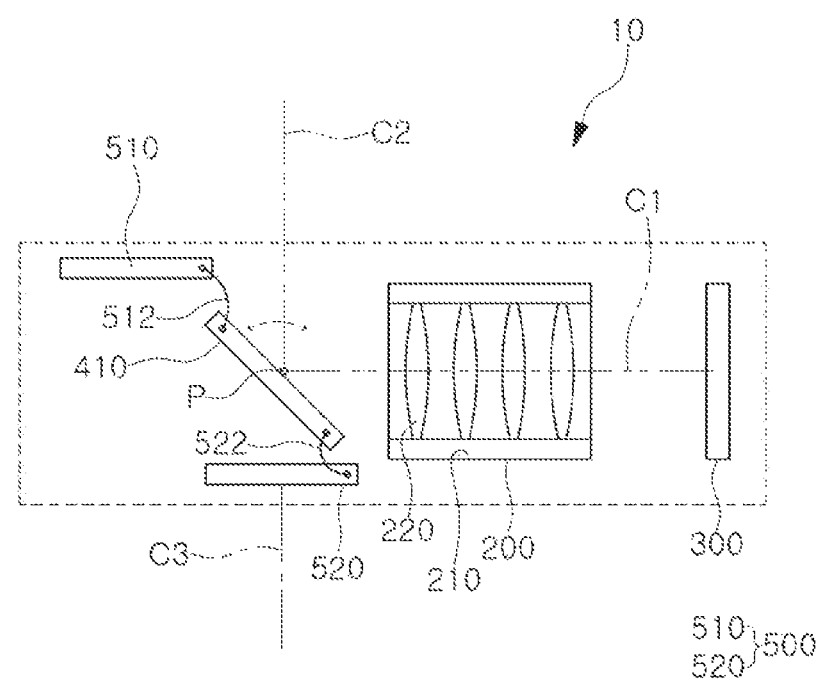
FIG. 1 is a diagram illustrating a configuration of a camera module according to an example embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

The example embodiments described herein are directed to solving the above problem and provide a camera module configured to selectively capture an image of subjects located to the front and rear of a portable terminal, and a portable terminal including the same.

The camera module described in the present disclosure may be mounted on a portable electronic product. For example, the camera module may be mounted on a portable telephone, a laptop, or the like. However, a usage range of the camera module according to the example embodiments is not limited thereto. For example, the camera module may be mounted in any electronic device in which a camera module can be installed in front and rear surfaces thereof.

A camera module according to an example embodiment will be described with reference to FIGS. 1, 2A, 2B, and 2C.

A camera module 10 according to the present example embodiment may include a lens module 200, an image sensor 300, an optical path converting member 410 and a light-blocking member 500. However, a configuration of the camera module 10 is not limited thereto. For example, the camera module 10 may further include a housing for accommodating the lens module 200, the image sensor 300, the optical path converting member 410 and the light-blocking member 500.

The lens module 200 is configured to have a single optical path. For example, the lens module 200 may include a lens barrel 210 and one or more lenses 220. The lens barrel 210 is configured to accommodate the one or more lenses 220. The lens barrel 210 may be configured to sequentially arrange the lenses 220 in a first optical path direction C1. For example, a lens-accommodating space of the lens barrel 210 may be formed to be parallel along the first optical path C1. The lens barrel 210 may have a substantially cylindrical shape, but is not limited thereto. The one or more lenses 220 may be disposed in the lens barrel 210. The one or more lenses 220 may have predetermined refractive power. For example, the one or more lenses 220 may have positive or negative refractive power. The lens module 200 may have a predetermined focal length. A focus of the lens module 200 may be located on the first optical path C1. The lens module 200 configured as above may refract light incident along the one or more lenses 220 to form an image on the image sensor 300.

The image sensor 300 is configured to convert an optical signal refracted by the lens module 200 into an electric signal. The image sensor 300 may be manufactured in the form of a CCD. One surface of the image sensor 300 may form an image surface on which an image of light refracted by the lens module 200 is formed. The image sensor 300 may be disposed such that the image of light refracted by the lens module 200 can be formed without distortion. For example, the image sensor 300 may be disposed to have an optical axis parallel to the first optical path C1 of the lens module 200.

The optical path converting member 410 may be configured to convert a path of light incident to the camera module 10. In addition, the optical path converting member 410 may reflect or refract light incident in a direction intersecting the first optical path (axis) C1 to the lens module 200. As an example, the optical path converting member 410 reflects or refracts light incident along a second optical path (axis) C2 in the direction of the first optical path C1. As another example, the optical path converting member 410 reflects or refracts light incident along a third optical path (axis) C3 in a direction of the second optical path C2. The optical path converting member 410 may be configured to be rotatable. For example, the optical path converting member 410 may rotate with respect to a point P at which the first optical path C1 and the second optical path C2 intersect or a point P at which the first optical path C1 and the third optical path (axis) C3 intersect. The optical path converting member 410 may be configured in the form of reflecting or refracting light so as to convert a path of light. For example, the optical path converting member 410 may be configured as a prism, a reflector, or the like.

The light-blocking member 500 may include a first light-blocking member 510 and a second light-blocking member 520. The first light-blocking member 510 is disposed in a front of the camera module 10, while the second light-blocking member 520 is disposed in a rear of the camera module 10. The light-blocking member 500 is configured to selectively block light incident along the second optical path C2 and the third optical path C3. For example, the first light-blocking member 510 is configured to selectively block light incident along the second optical path C2, and the second light-blocking member 520 is configured to selectively block light incident along the third optical path C3. The light-blocking member 500 may move substantially in parallel with the first optical path C1. For example, the first light-blocking member 510 and the second light-blocking member 520 may linearly move in a direction closer to or away from the lens module 200 as the optical path converting member 410 rotates.

The light-blocking member 500 may be connected to the optical path converting member 410. For example, the first light-blocking member 510 may be connected to one end of the optical path converting member 410, and the second light-blocking member 520 may be connected to the other end of the optical path converting member 410. The light-blocking member 500 and the optical path converting member 410 may be directly or indirectly connected to each other. For example, the light-blocking member 500 may be connected to the optical path converting member 410 by a separate fastening member or may be connected to the optical path converting member 410 by connecting members 512 and 522. The connecting members 512 and 522 may be elastically deformable. For example, the connecting members 512 and 522 may be configured to be extended or compressed according to a distance between the light-blocking member 500 and the optical path converting member 410. However, a shape of the connecting members 512 and 522 is not limited to the shape described above.

Figure 2A:
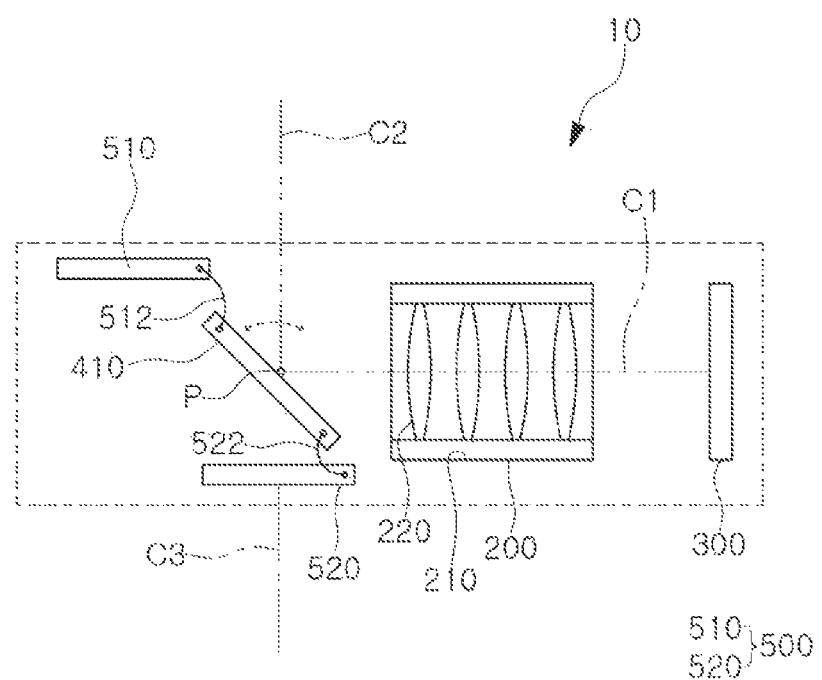
FIGS. 2A, 2B, and 2C are cross-sectional views illustrating a usage state of the camera module illustrated in FIG. 1.
Figure 2B:
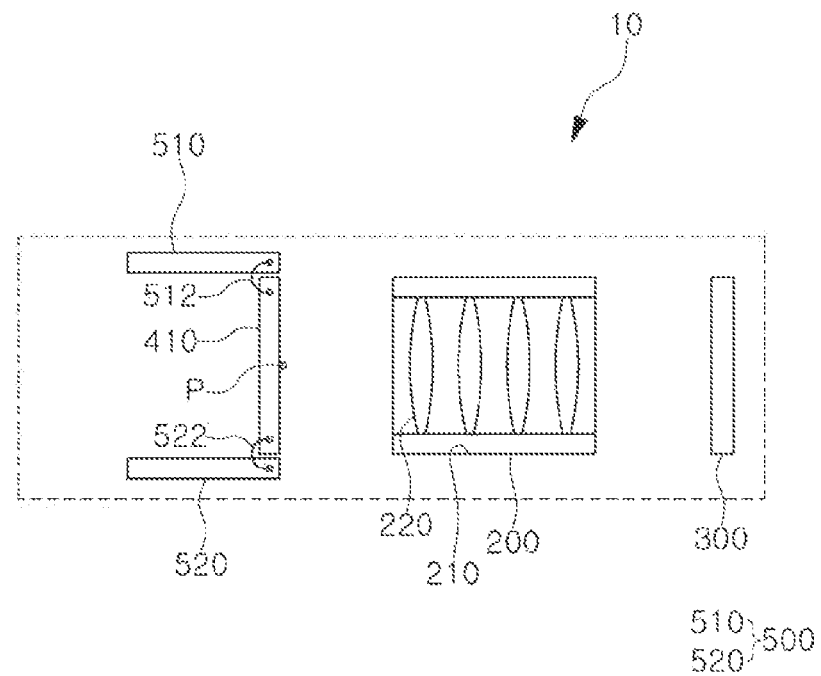
Figure 2C:
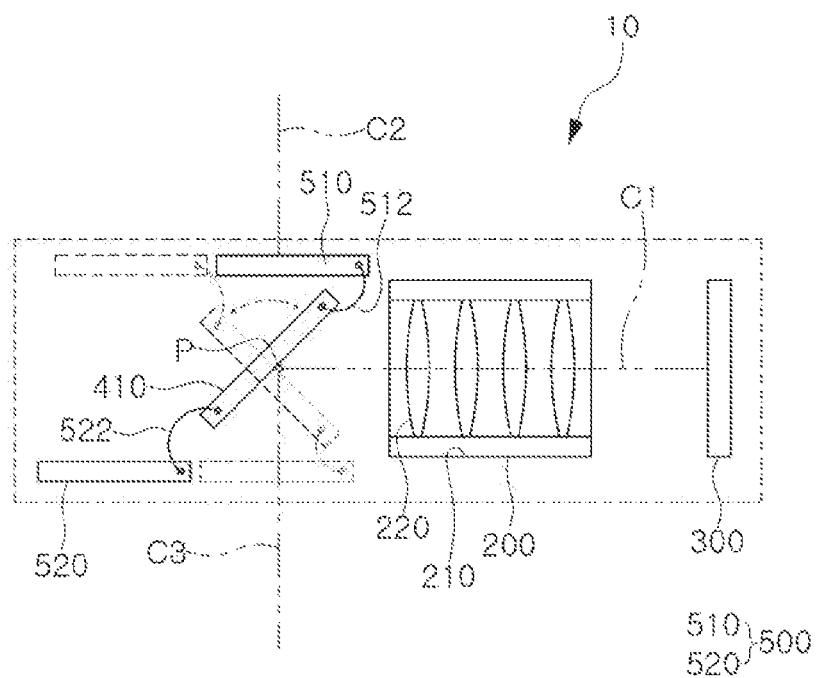

An operating state of the camera module 10 will be described with reference to FIGS. 2A, 2B, and 2C.

The camera module 10 is configured to capture light incident from different directions through a single lens module 200. As an example, the camera module 10 reflects or refracts light incident along the second optical path C2 in the direction of the first optical path C1 to capture an image of a subject located on the second optical path C2 (hereinafter, referred to as "front image capture mode"). As another example, the camera module 10 reflects or refracts light incident along the third optical path C3 in the direction of the first optical path C1 to capture an image of a subject located on the third optical path C3 (hereinafter, referred to as "rear image capture mode").

The front image capture mode of the camera module 10 may be performed in an initial state of the camera module 10 or in a non-driving state of the optical path converting member 410. For example, the front image capture mode may be performed while the second optical path C2 is open as illustrated in FIG. 2A. In this regard, the light incident along the second optical path C2 may be reflected or refracted in the direction of the first optical path C1 by the optical path converting member 410 to reach the image sensor 300. In contrast thereto, the light incident along the third optical path C3 is blocked by the second light-blocking member 520 and cannot reach the optical path converting member 410 and the image sensor 300.

The rear image capture mode of the camera module 10 may be performed through a series of processes in the front image capture mode. For example, the rear image capture mode may be performed by rotating the optical path converting member 410 as illustrated in FIGS. 2A to 2C. Positions of the first light-blocking member 510 and the second light-blocking member 520 may be changed by rotational motion of the optical path converting member 410. For example, the first light-blocking member 510 moves to close the second light path C2 as the optical path converting member 410 is rotated, and the second light-blocking member 520 moves to open the third optical path C3 as the optical path converting member 410 is rotated. Accordingly, light incident along the third optical path C3 in the rear image capture mode may be reflected or refracted by the optical path converting member 410 to reach the image sensor 300. In contrast thereto, the light incident along the second optical path C2 is blocked by the first light-blocking member 510 and cannot reach the optical path converting member 410 and the image sensor 300.

Figure 3:
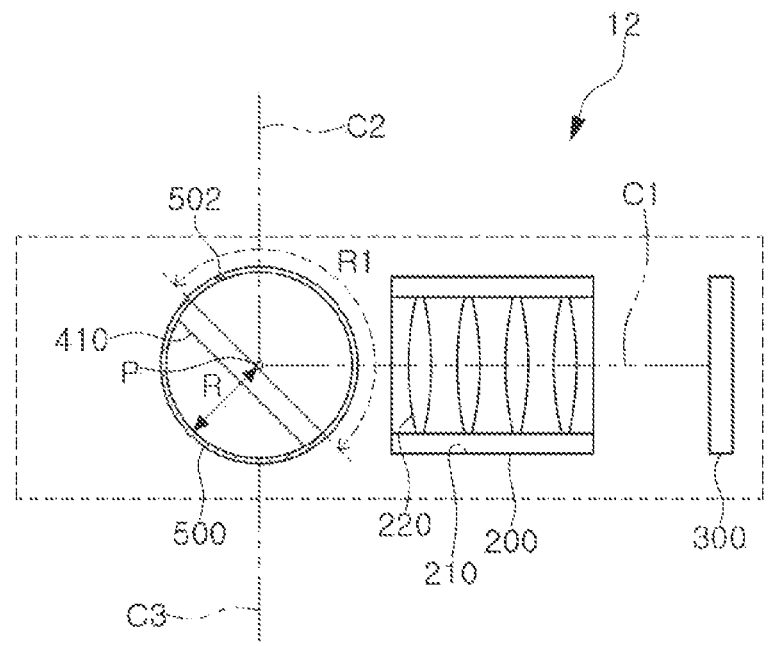
FIG. 3 is a diagram illustrating a configuration of a camera module according to another example embodiment.
Figure 4:
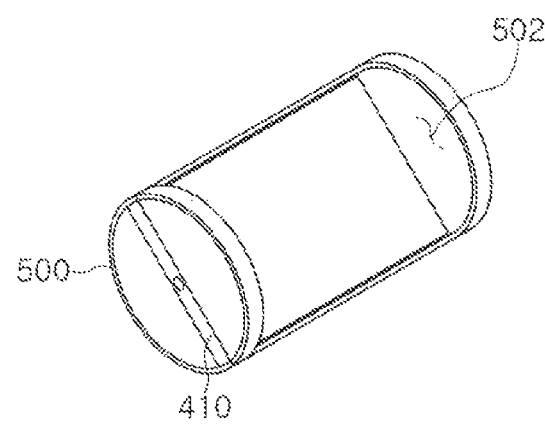
FIG. 4 is an enlarged perspective view of a light-blocking member illustrated in FIG. 3.

A camera module according to another example embodiment will be described with reference to FIGS. 3 and 4.

A camera module 12 according to the present example embodiment may include a lens module 200, an image sensor 300, an optical path converting member 410, and a light-blocking member 500.

The lens module 200 is configured to have a single optical path. For example, the lens module 200 may include a lens barrel 210 and one or more lenses 220. The lens barrel 210 is configured to accommodate the one or more lenses 220. The lens barrel 210 may be configured to sequentially arrange the lenses 220 in a first optical path direction C1. For example, a lens-accommodating space of the lens barrel 210 may be formed to be parallel along the first optical path C1. The lens barrel 210 may substantially have a cylindrical shape, but is not limited thereto. The one or more lenses 220 may be disposed in the lens barrel 210. The one or more lenses 220 may have predetermined refractive power. For example, the one or more lenses 220 may have positive or negative refractive power. The lens module 200 may have a predetermined focal length. A focus of the lens module 200 may be located on the first optical path C1. The lens module 200 configured as above may refract light incident along the one or more lenses 220 to form an image on the image sensor 300.

The image sensor 300 is configured to convert an optical signal refracted by the lens module 200 into an electric signal. The image sensor 300 may be manufactured in the form of a CCD. One surface of the image sensor 300 may form an image surface on which an image of light refracted by the lens module 200 is formed. The image sensor 300 may be disposed such that the image of light refracted by the lens module 200 can be formed without distortion. For example, the image sensor 300 may be disposed to have an optical axis parallel to the first optical path C1 of the lens module 200.

The optical path converting member 410 may be configured to convert a path of light incident to the camera module 12. The optical path converting member 410 may reflect or refract light incident in a direction intersecting the first optical path C1 (for example, directions of the second optical path C2 and the third optical path C3) to the lens module 200. The optical path converting member 410 may be configured to be rotatable. For example, the optical path converting member 410 may rotate with respect to a point P at which the first optical path C1 and the second optical path C2 intersect or a point P at which the first optical path C1 and the third optical path C3 intersect. The optical path converting member 410 may be configured in the form of reflecting or refracting light so as to convert a path of light. For example, the optical path converting member 410 may be configured as a prism, a reflector, or the like.

The light-blocking member 500 may be formed to have a substantially rotationally symmetrical shape with respect to a point P at which the first light path C1 and the second light path C2 intersect. For example, a body of the light-blocking member 500 may be formed to have a cylindrical shape having a radius of R. However, the body of the light-blocking member 500 is not necessarily formed to have a cylindrical shape. For example, the light-blocking member 500 may be changed to have a different shape within a range allowing rotational symmetry with respect to the point P. The light-blocking member 500 may be configured to accommodate the optical path converting member 410. For example, the optical path converting member 410 may be disposed inside the light-blocking member 500. The light-blocking member 500 may be configured to be rotatable. For example, the light-blocking member 500 may rotate together with the optical path converting member 410 with respect to the point P. The light-blocking member 500 may be configured to selectively allow incidence of light transferring along the second light path C2 or the third light path C3. For example, an opening 502, through which light can pass, may be formed in a circumferential surface of the light-blocking member 500. The opening 502 may be formed to have predetermined size. For example, a circumferential length R1 of the opening 502 may be ½ or less of a circumferential length ($2*\pi R$) of the light-blocking member 500.

Figure 5A:
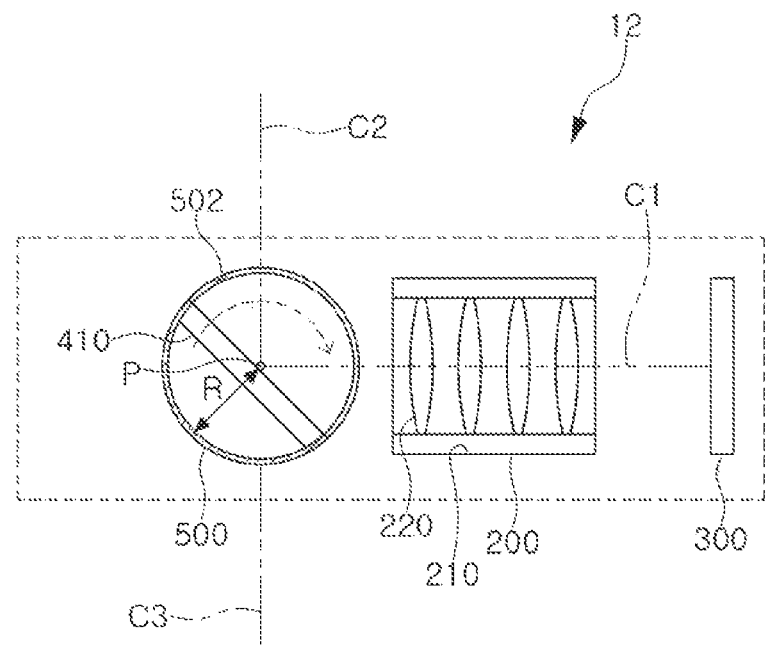
FIGS. 5A, 5B, and 5C are cross-sectional views illustrating a usage state of the camera module illustrated in FIG. 3.
Figure 5B:
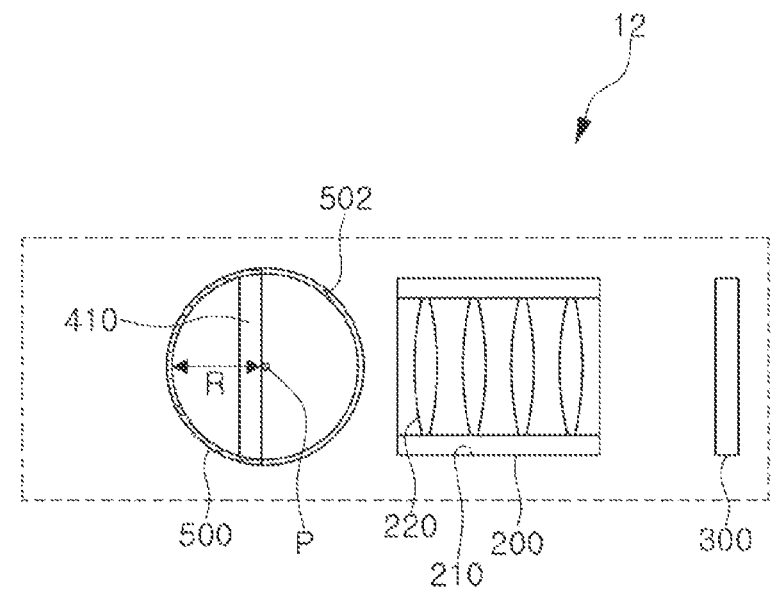
Figure 5C:
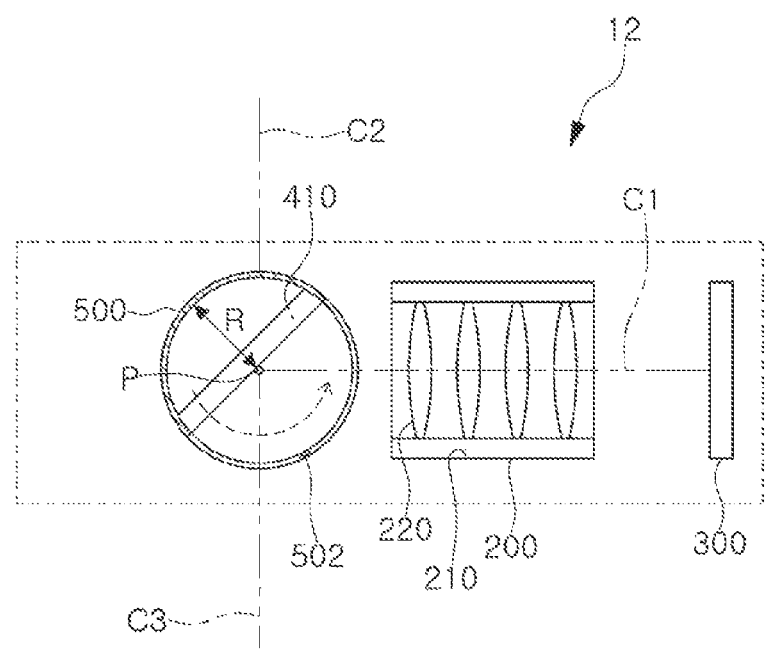
Figure 6:
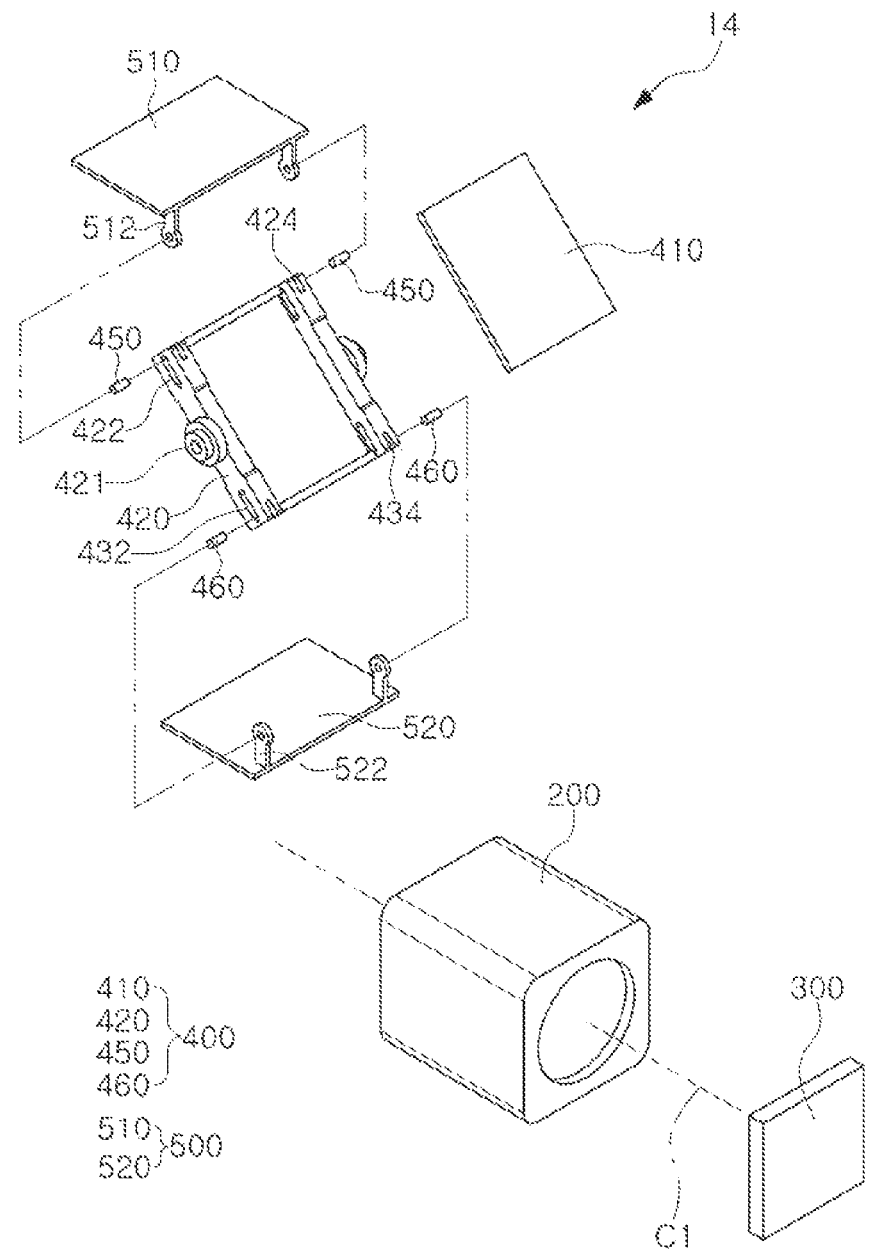
FIG. 6 is a diagram illustrating a configuration of a camera module according to another example embodiment.

A usage state of the camera module 12 will be described with reference to FIGS. 5A, 5B, and 5C.

The camera module 12 is configured to capture light incident from different directions through a single lens module 200. As an example, the camera module 12 reflects or refracts light incident along the second optical path C2 in the direction of the first optical path C1 to capture an image of a subject located on the second optical path C2 (hereinafter, referred to as "front image capture mode"). As another example, the camera module 12 reflects or refracts light incident along the third optical path C3 in the direction of the first optical path C1 to capture an image of a subject located on the third optical path C3 (hereinafter, referred to as "rear image capture mode").

The front image capture mode of the camera module 12 may be performed in an initial state of the camera module 12 or in a non-driving state of the optical path converting member 410. For example, the front image capture mode may be performed while the second optical path C2 is opened by the opening 502 of the light-blocking member 500 as illustrated in FIG. 5A. In this regard, the light incident along the second optical path C2 may be reflected or refracted in the direction of the first optical path C1 by the optical path converting member 410 to reach the image sensor 300. In contrast thereto, the light incident along the third optical path C3 is blocked by a circumferential surface of the light-blocking member 500 and cannot reach the optical path converting member 410 and the image sensor 300.

The rear image capture mode of the camera module 12 may be performed through a series of processes in the front image capture mode. For example, the rear image capture mode may be performed by rotating the light-blocking member 500 and the optical path converting member 410 as illustrated in FIGS. 5A to 5C. The rotational motion of the light-blocking member 500 may change positions of the opening 502. For example, the position of the opening may be changed to face the third optical path C3 and the first optical path C1 when the light-blocking member 500 rotates by 90°. Accordingly, light incident along the second optical path C2 in the rear image capture mode may be blocked by the circumferential surface of the light-blocking member 500 and cannot reach the optical path converting member 410 and the image sensor 300. In contrast thereto, the light incident along the third optical path C3 is reflected or refracted by the optical path converting member 410 to reach the image sensor 300.

The camera module 12 configured as above can allow the selective incidence of the second optical path C2 and the third optical path C3 through the light-blocking member 500 in the form of one component, thereby reducing a manufacturing cost thereof.

A camera module according to another example embodiment will be described with reference to FIGS. 6, 7, 8, 9A, 9B, and 9C.

A camera module 14 according to the present example embodiment may include a lens module 200, an image sensor 300, an optical path converting component 400, and a light-blocking member 500.

The lens module 200 is configured to have a single optical path. For example, the lens module 200 may include a lens barrel 210 and one or more lenses 220.

The image sensor 300 is configured to convert an optical signal refracted by the lens module 200 into an electric signal. The image sensor 300 may be manufactured in the form of a CCD. One surface of the image sensor 300 may form an image surface on which an image of light refracted by the lens module 200 is formed. The image sensor 300 may be disposed such that the image of light refracted by the lens module 200 can be formed without distortion. For example, the image sensor 300 may be disposed to have an optical axis parallel to the first optical path C1 of the lens module 200.

The optical path converting component 400 may be configured to convert a path of light incident to the camera module 14. For example, the optical path converting component 400 may reflect or refract light incident in a direction intersecting the first optical path C1 to the lens module 200. The optical path converting component 400 may include an optical path converting member 410 and a support member 420. The optical path converting component 400 may be configured to be rotatable. For example, the optical path converting member 410 and the support member 420 may rotate with respect to a fixed shaft 421 of the support member 420. The optical path converting member 410 may be configured to reflect or refract light so as to change a path of light. For example, the optical path converting member 410 may be configured as a prism, a reflector, or the like. The support member 420 may be configured to bind to the light-blocking member 500. For example, cam grooves 422 and 432 and fitting grooves 424 and 434 may be formed in the support member 420. The cam grooves 422 and 432 may be formed to elongate in a length direction of the support member 420. The cam grooves 422 and 432 may serve to convert a rotational motion of the optical path converting component 400 into linear motion of the light-blocking member 500. Fixing pins 450 and 460 connecting the support member 420 to the light-blocking member 500 may be inserted into the cam grooves 422 and 432. The fitting grooves 424 and 434 are configured to bind to the light-blocking member 500. For example, a portion of the light-blocking member 500 may be fitted into the fitting grooves 424 and 434.

The light-blocking member 500 may include a first light-blocking member 510 and a second light-blocking member 520. The first light-blocking member 510 is disposed in a front of the camera module 14, while the second light-blocking member 520 is disposed in a rear of the camera module 14. The light-blocking member 500 is configured to selectively block light incident along the second optical path C2 and the third optical path C3. The light-blocking member 500 may move substantially in parallel with the first optical path C1. For example, the first light-blocking member 510 and the second light-blocking member 520 may linearly move in a direction closer to or away from the lens module 200 as the optical path converting member 410 rotates. Connecting members (extension units) 512 and 522 configured to extend in the direction intersecting the first optical path C1 may be formed in the light-blocking member 500. For example, the extension units 512 and 522 may be formed below the first light-blocking member 510 and above the second light-blocking member 520. The light-blocking member 500 may bind to the optical path converting component 400. For example, the extension unit 512 of the first light-blocking member 510 and the extension unit 522 of the second light-blocking member 520 may bind to the support member 420 of the optical path converting component 400.

Figure 7:
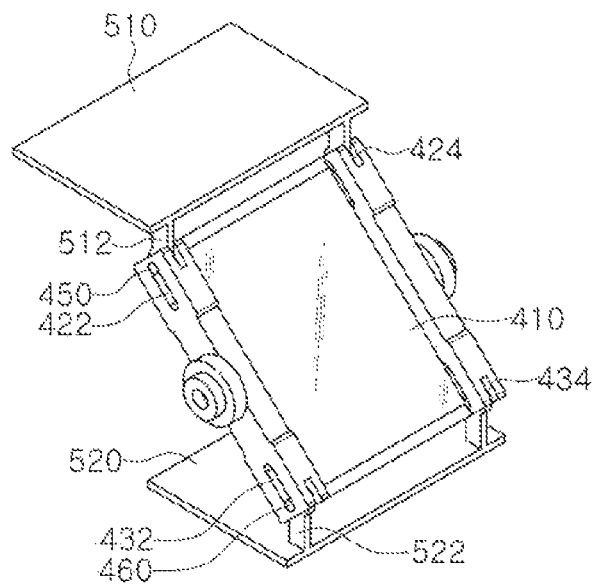
FIG. 7 is a diagram illustrating a coupling structure of a light-blocking member illustrated in FIG. 6.

A coupling structure of the optical path converting component 400 and the light-blocking member 500 will be described with reference to FIG. 7.

The optical path converting component 400 may be coupled to the light-blocking member 500. For example, the support member 420 of the optical path converting component 400 may be coupled to the first light-blocking member 510 and the second light-blocking member 520. The first light-blocking member 510 and the second light-blocking member 520 may be coupled to the fitting grooves 424 and 434 of the support member 420. For example, the extension unit 512 of the first light-blocking member 510 may be inserted into the fitting groove 424, and the extension unit 522 of the second light-blocking member 520 may be inserted into the fitting groove 434. The extension units 512 and 522 may be fixed to the support member 420 by the fixing pins 450 and 460. For example, the extension unit 512 of the first light-blocking member 510 is fixed to the support member 420 by the fixing pin 450 penetrating the cam groove 422, and the extension unit 522 of the second light-blocking member 520 is fixed to the support member 420 by the fixing pin 460 penetrating the cam groove 432. The extension units 512 and 522 may move along the cam grooves 422 and 432. For example, the extension units 512 and 522 of the light-blocking members 510 and 520 may move inwardly or outwardly of the cam grooves 422 and 432 as the support member 420 rotates.

Figure 8:
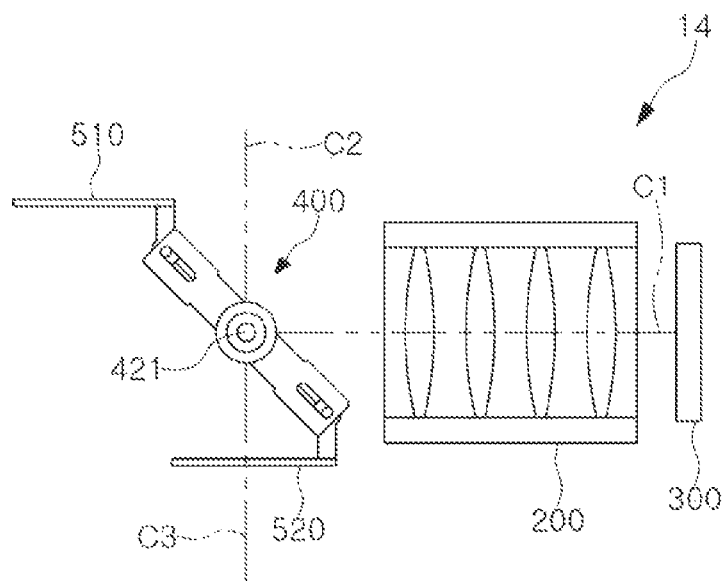
FIG. 8 is a diagram illustrating a coupling structure of the camera module illustrated in FIG. 6.

The camera module 14 configured as described above selectively reflects or refracts light incident along the second optical path C2 or the third optical path C3 toward the first optical path C1 and blocks light incident along an unselected optical path, as illustrated in FIG. 8. As an example, the camera module 14 may reflect light incident along the second optical path C2 toward the first optical path C1 and block light incident along the third optical path C3. As another example, the camera module 14 may reflect light incident along the third optical path C3 toward the first optical path C1 and block light incident along the second optical path C2.

An operation example of the camera module 14 described above will be described with reference to FIGS. 9A to 9C.

The camera module 14 is configured to form an image of light incident from both directions intersecting the first optical path C1. For example, the camera module 14 forms an image of a subject on the second optical path C2 (hereinafter, referred to as "front image capture mode") or an image of a subject located on the third optical path C3 (hereinafter, referred to as "rear image capture mode").

A mode change of the camera module 14 may be comprehensively carried out by rotation of the optical path converting component 400. For example, the rotation of the optical path converting component 400 may accompany a movement of the light-blocking member 500. As an example, when the optical path converting component 400 rotates clockwise in a state illustrated in FIG. 9A to 9C, the first light-blocking member 510 may move to the right while the second light blocking member 520 may move to the left. In contrast, when the optical path converting component 400 rotates counterclockwise in a state illustrated in FIG. 9C to 9A, the first light-blocking member 510 may move to the left and the second light blocking member 520 may move to the right. In addition, the rotation of the optical path converting component 400 may involve blocking the second optical path C2 or the third optical path C3. For example, when the optical path converting component 400 rotates clockwise in the state illustrated in FIG. 9A to 9C, the second optical path C2 may be blocked by the first light-blocking member 510. In contrast, when the optical path converting component 400 rotates counterclockwise in the state illustrated in FIG. 9C to 9A, the third optical path C3 may be blocked by the second light-blocking member 520.

The front image capture mode and the rear image capture mode of the camera module 14 will be described.

Figure 9A:
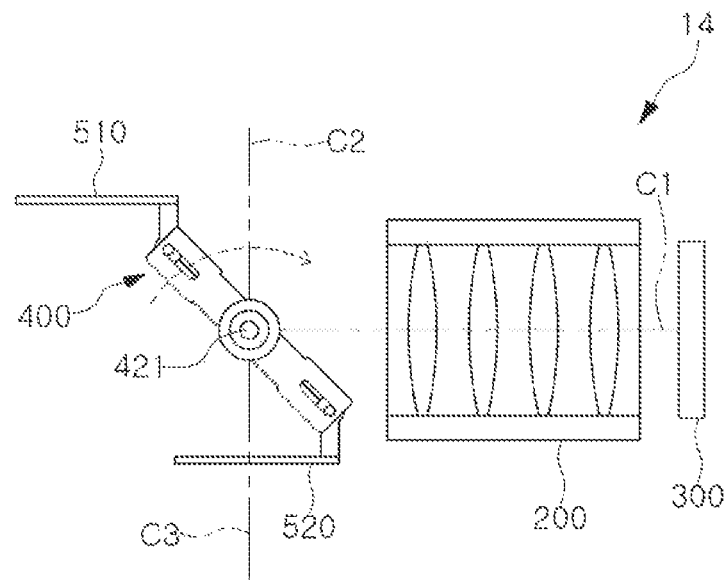
FIGS. 9A, 9B, and 9C are cross-sectional views illustrating a usage state of the camera module illustrated in FIG. 8.
Figure 9B:
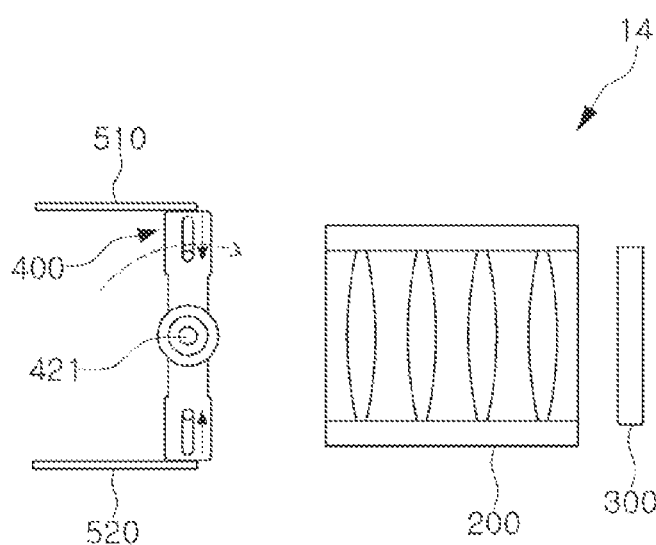

The front image capture mode of the camera module 14 may be performed in the state in which the second optical path C2 is opened and the third optical path C3 is closed by the second light-blocking member 520 as illustrated in FIG. 9A. Light incident along the second optical path C2 in the front image capture mode may be reflected or refracted in the direction of the first optical path C1 by the optical path converting component 400 to reach the image sensor 300. In contrast thereto, light incident along the third optical path C3 is blocked by the second light-blocking member 520 and cannot reach the image sensor 300.

The front image capture mode may be switched to the rear image capture mode through the optical path converting component 400. For example, when the optical path converting component 400 rotates clockwise, the front image capture mode may be switched to the rear image capture mode.

Figure 9C:
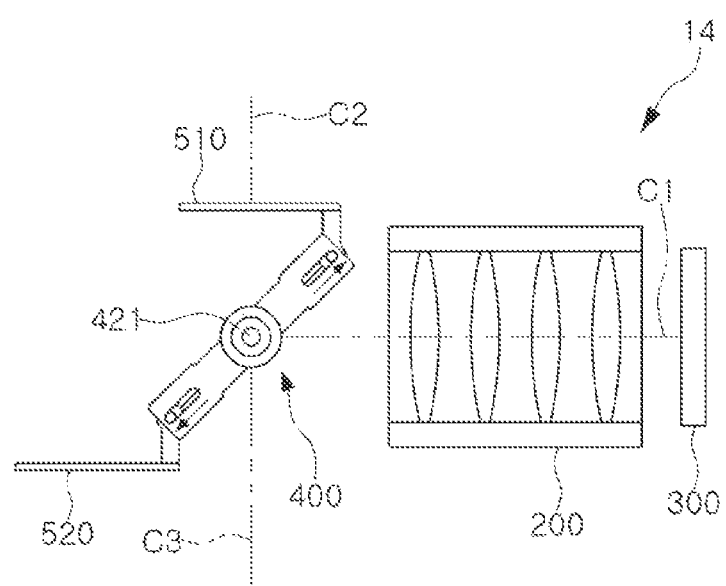
Figure 10:
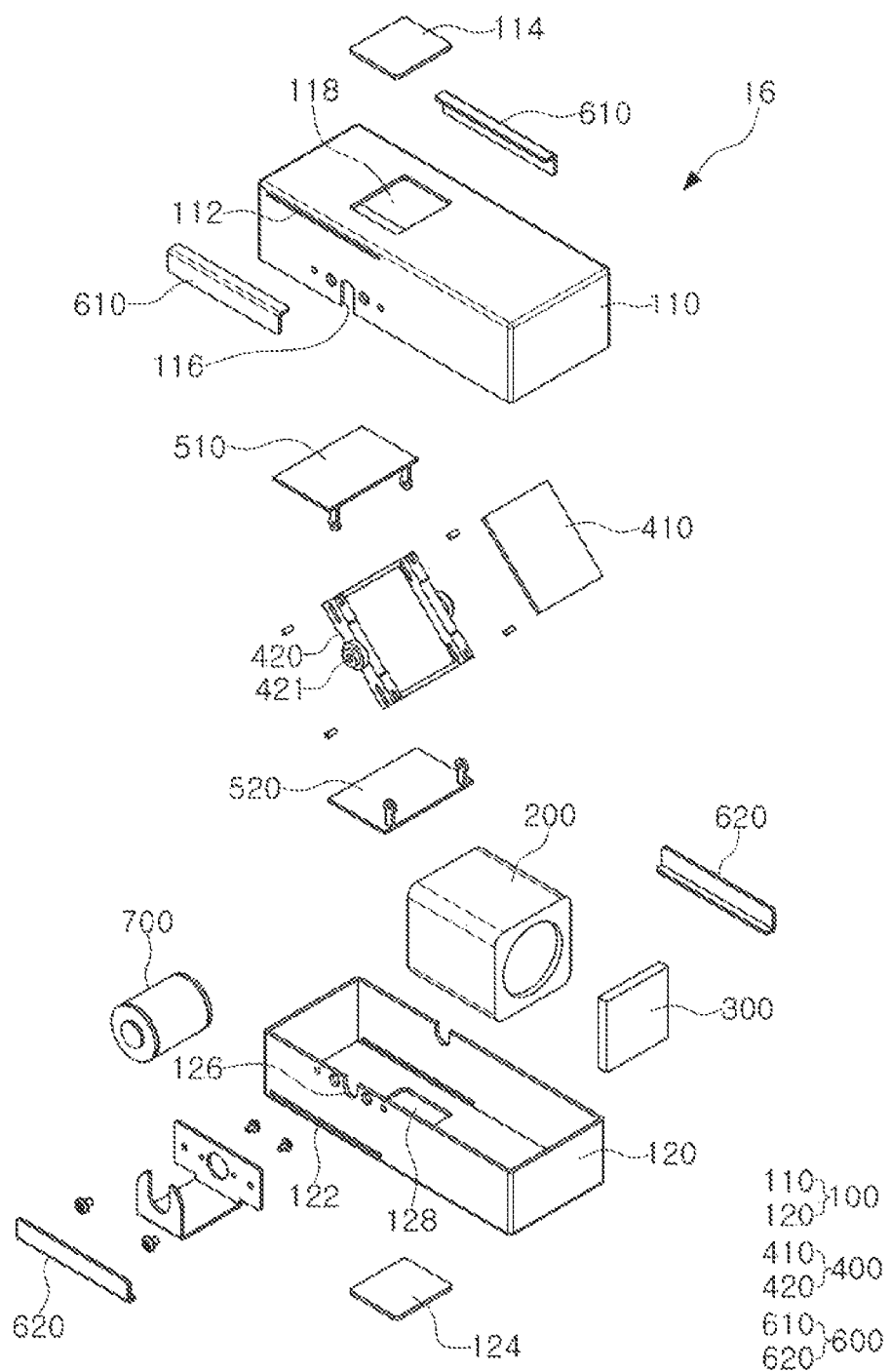
FIG. 10 is an exploded perspective view of a camera module according to another example embodiment.

The rear image capture mode of the camera module 14 may be performed in the state in which the second optical path C2 is closed by the first light-blocking member 510 and the third optical path C3 is opened, as illustrated in FIG. 9C. Light incident along the third optical path C3 in the rear image capture mode may be reflected or refracted in the direction of the first optical path C1 by the optical path converting component 400 to reach the image sensor 300. In contrast thereto, light incident along the second optical path C2 is blocked by the first light-blocking member 510 and cannot reach the image sensor 300.

The camera module 14 configured as described above can capture images of subjects located in both front and rear of the camera module 14 through a single lens module 200, thereby reducing a size of a portable terminal mounted on the camera module 14. In addition, the camera module 14 can block light incident to a non-use optical path through the first and second light-blocking members 510 and 520, thereby reducing flare and resolution impairment caused by light incident along the non-use optical path. Further, as the camera module 14 according to the present example embodiment simultaneously changes the optical path and shields/opens the optical path by the rotation of the optical path converting component 400, the front and rear image captures can be rapidly and accurately performed.

A camera module according to another example embodiment will be described with reference to FIGS. 10, 11, 12A, 12B, 13A, and 13B.

A camera module 16 according to the present example embodiment may include a lens module 200, an image sensor 300, an optical path converting component 400, and a light-blocking member 500. However, a configuration of the camera module 16 is not limited thereto. For example, the camera module 16 may further include a housing (100, 110, and 120), guide members (600, 610, and 620), and a first driving member 700. In addition, the camera module 16 may further include a second driving member configured to move the lens module 200 relative to a first optical path C1.

Hereinafter, the above-mentioned components will be described in detail. For reference, the lens module 200, the image sensor 300, the optical path converting component 400, and the light-blocking member 500 according to the present example embodiment are the same as or similar to the configurations illustrated in FIGS. 6 to 9C, therefore further detailed descriptions thereof will be omitted.

The housing 100 may be configured to accommodate main components configuring the camera module 16 therein. For example, the housing 100 may accommodate the lens module 200, the image sensor 300, the optical path converting component 400, and the light-blocking member 500 therein. The housing 100 may include a first housing 110 and a second housing 120, but is not limited thereto. For example, a separate supplemental housing may further be included, if necessary.

Windows 118 and 128, through which light may be transmitted, may be formed in the first housing 110 and the second housing 120. For example, the window 118 connected to the second optical path C2 is formed in the first housing 110, and the window 128 connected to the third optical path C3 is formed in the second housing 120. The windows 118 and 128 may be formed to be smaller than the light-blocking members 510 and 520. In this regard, when the light-blocking members 510 and 520 are located in a center of the respective windows 118 and 128, the windows 118 and 128 can be completely closed by the light-blocking members 510 and 520. Protective covers 114 and 124 may be disposed on the windows 118 and 128. The protective covers 114 and 124 may be formed of a transparent material such that light can be transmitted. For example, the protective covers 114 and 124 may be formed of a glass material. Coupling grooves 116 and 126 for supporting the optical path converting component 400 may be formed in the first housing 110 and the second housing 120. For example, a fixing shaft 421 of the support member 420 may be inserted into and fixed to the coupling groove 116 of the first housing 110 and the coupling groove 126 of the second housing 120. Guide grooves 112 and 122 for mounting the guide member 600 may be formed in the first housing 110 and the second housing 120. The guide grooves 112 and 122 may be formed in a length direction of the first housing 110 and the second housing 120.

The guide member 600 is formed in the housing 100. For example, the first guide member 610 is fitted into the guide groove 112 of the first housing 110, and the second guide member 620 is fitted into the guide groove 122 of the second housing 120. The guide member 600 may be in the form of being extended substantially in parallel with the first optical path C1. Accordingly, a member in contact with the guide member 600 may linearly move substantially in parallel with the first optical path C1. The guide member 600 may enable the light-blocking member 500 to linearly move. For example, the first guide member 610 may allow the first light-blocking member 510 to linearly move, while the second guide member 620 may allow the second light blocking member 520 to linearly move.

The first driving member 700 is configured to drive the optical path converting component 400. For example, the first driving member 700 is connected to the fixed shaft 421 of the support member 420 to rotate the support member 420. The first driving member 700 may be in the form of a motor enabling a rotational movement of the optical path converting component 400. However, the form of the first driving member 700 is not limited to being a motor. For example, the first driving member 700 may be a driving coil to move the support member by magnetic force.

Figure 11:
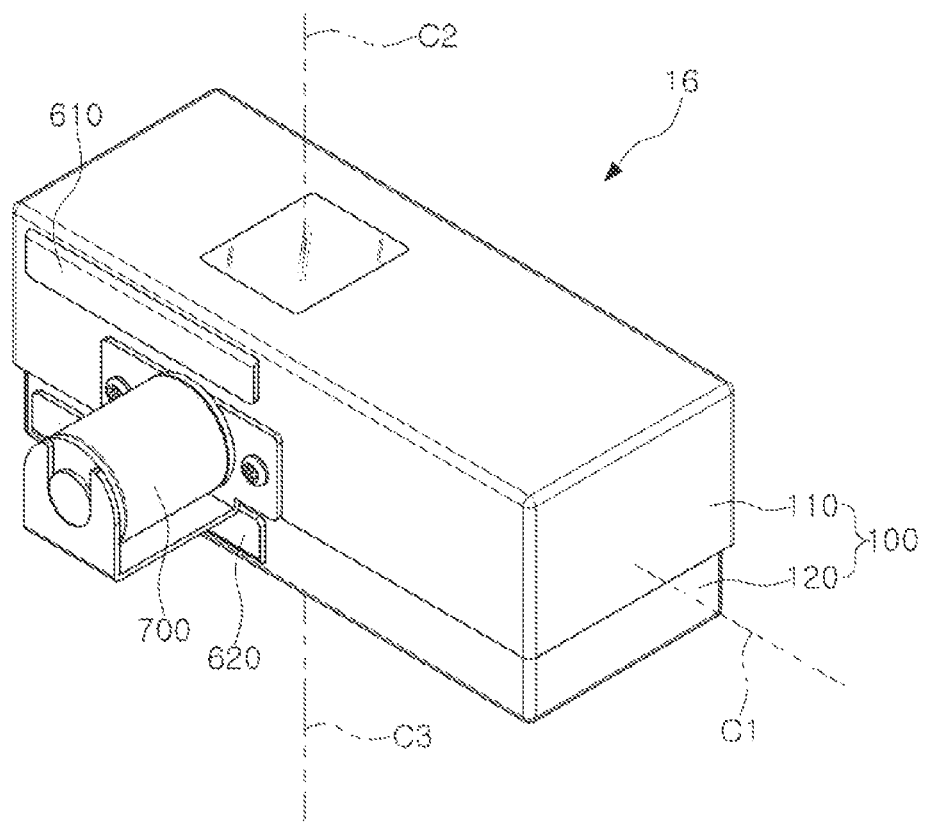
FIG. 11 is a diagram illustrating a coupling structure of the camera module illustrated in FIG. 10.
Figure 12A:
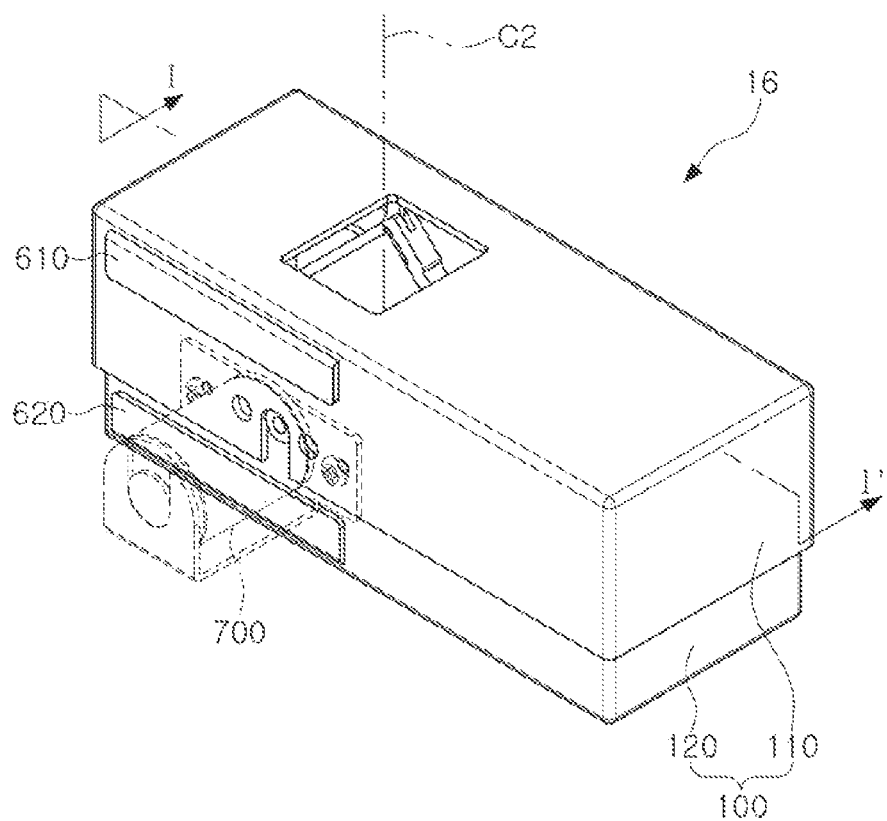
FIGS. 12A, 12B, 13A, and 13B are diagrams illustrating a usage state of the camera module illustrated in FIG. 11.
Figure 12B:
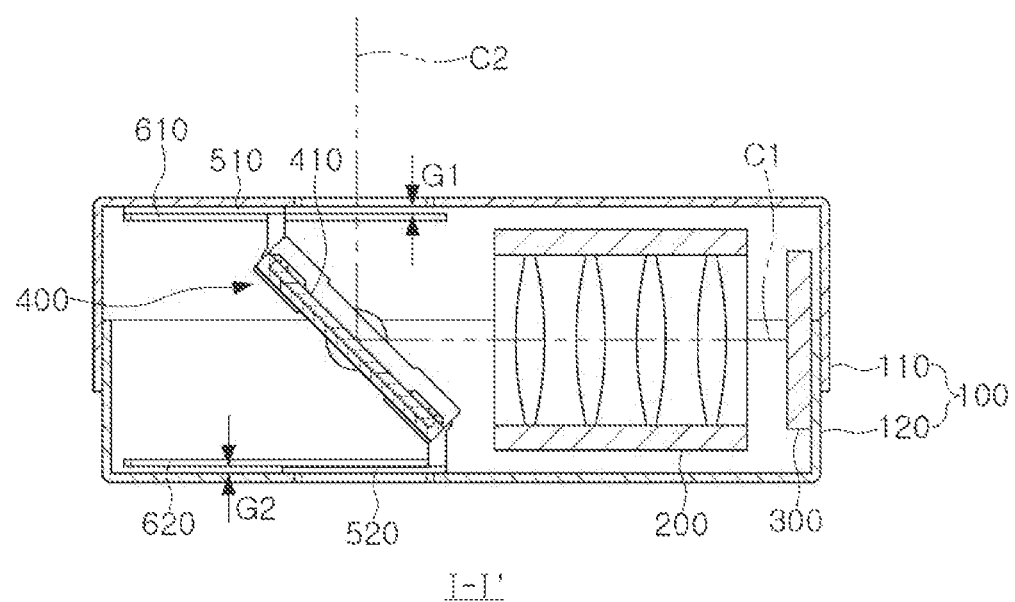
Figure 13A:
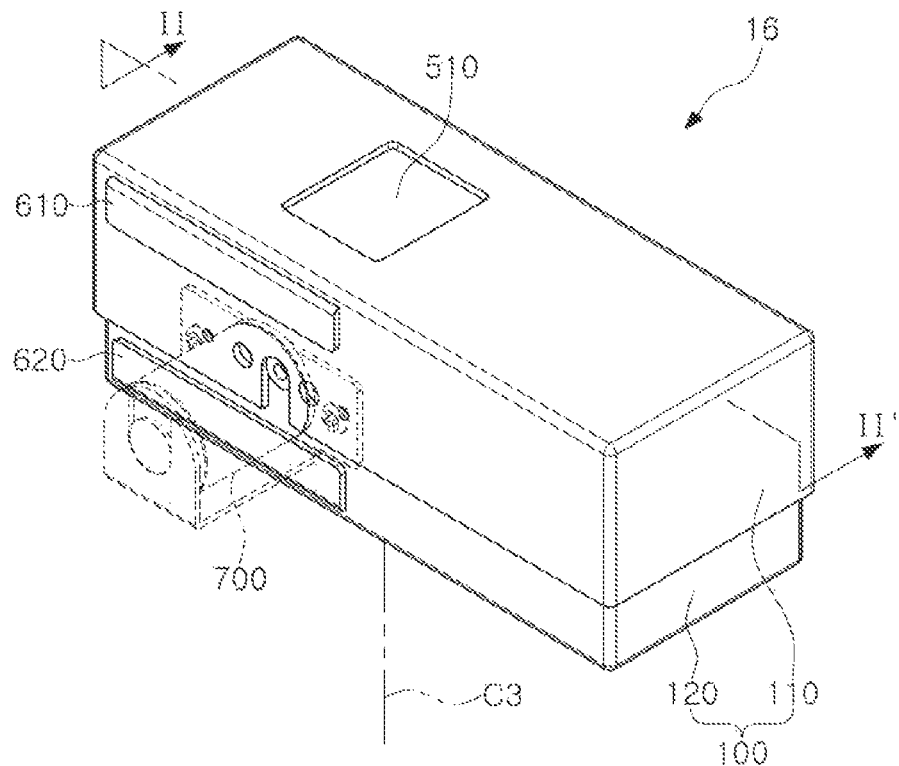
Figure 13B:
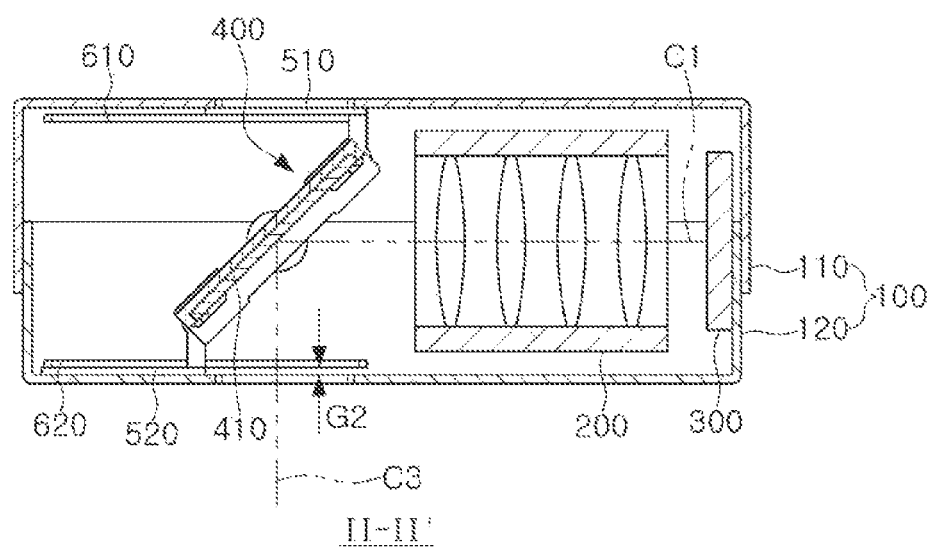

The camera module 16 configured as described above may be in the form of being extended along the first optical path C1 as illustrated in FIG. 11 or in the form of a thin film having a small height in the directions of the second and third optical paths C2 and C3. Accordingly, the camera module 16 according to the present example embodiment can be easily mounted on a thin portable terminal having a wide screen.

An operation example of the camera module 16 will be described with reference to FIGS. 12A, 12B, 13A, and 13B.

The camera module 16 is configured to form an image of light incident from both directions intersecting the first optical path C1. For example, the camera module 16 forms an image of a subject on the second optical path C2 (hereinafter, referred to as "front image capture mode") or an image of a subject located on the third optical path C3 (hereinafter, referred to as "rear image capture mode").

A mode change of the camera module 16 may be comprehensively carried out by rotation of the optical path converting component 400. For example, the rotation of the optical path converting component 400 may accompany a movement of the light-blocking member 500. As an example, when the optical path converting component 400 rotates clockwise in a state illustrated in FIGS. 12A and 12B, the first light-blocking member 510 may move to the right while the second light blocking member 520 may move to the left. In contrast, when the optical path converting component 400 rotates counterclockwise in a state illustrated in FIGS. 13A and 13B, the first light-blocking member 510 may move to the left and the second light blocking member 520 may move to the right. In addition, the rotation of the optical path converting component 400 may involve blocking the second optical path C2 or the third optical path C3. For example, when the optical path converting component 400 rotates clockwise in the state illustrated in FIGS. 12A and 12B, the second optical path C2 may be blocked by the first light-blocking member 510. In contrast, when the optical path converting component 400 rotates counter-clockwise in the state illustrated in FIGS. 13A and 13B, the third optical path C3 may be blocked by the second light-blocking member 520.

The camera module 16 according to the present example embodiment may enable stable movements of the light-blocking members 510 and 520. For example, the first light-blocking member 510 moves linearly along a first space G1 formed by the first guide member 610 and the first housing 110, and the second light-blocking member 520 moves linearly along a second space G2 formed by the second guide member 620 and the second housing 120.

The camera module 16 configured as described above can capture images of subjects located to both the front and rear of the camera module 16 through a single lens module 200, thereby reducing a size of a portable terminal mounted on the camera module 16. In addition, the camera module 16 can block light incident on a non-use optical path through the first and second light-blocking members 510 and 520, thereby reducing flare and resolution impairment caused by the light incident along the non-use optical path. Further, as the camera module 16 according to the present example embodiment simultaneously changes the optical path and shields/opens the optical path by the rotation of the optical path converting component 400, the front and rear image captures can be rapidly and accurately performed. In addition, in the camera module 16 according to the present embodiment, as the movement of the first and second light-blocking members 510 and 520 is stably guided by the first and second guide members 610 and 620, light leakage through the gaps between the windows 118 and 128 and the first and second light-blocking members 510 and 520 can be reliably blocked.

Figure 14A:
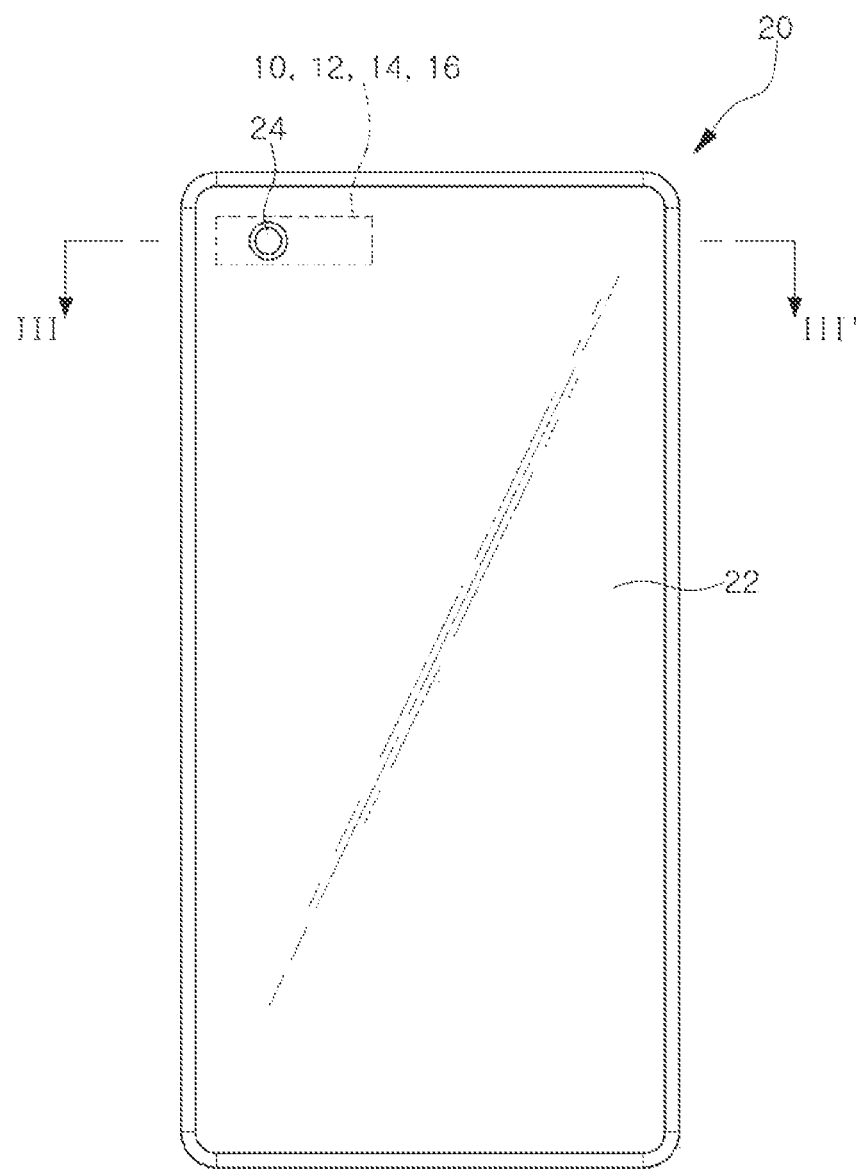
FIGS. 14A and 14B are a front view and a rear view of a portable terminal according to an example embodiment.
Figure 14B:
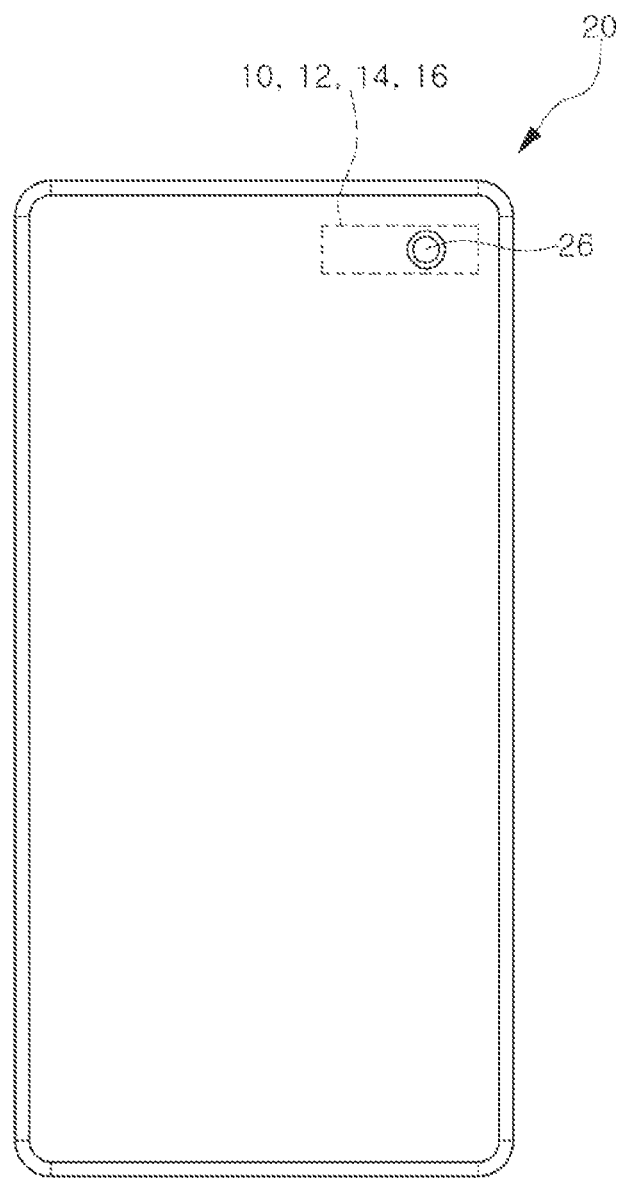
Figure 15:
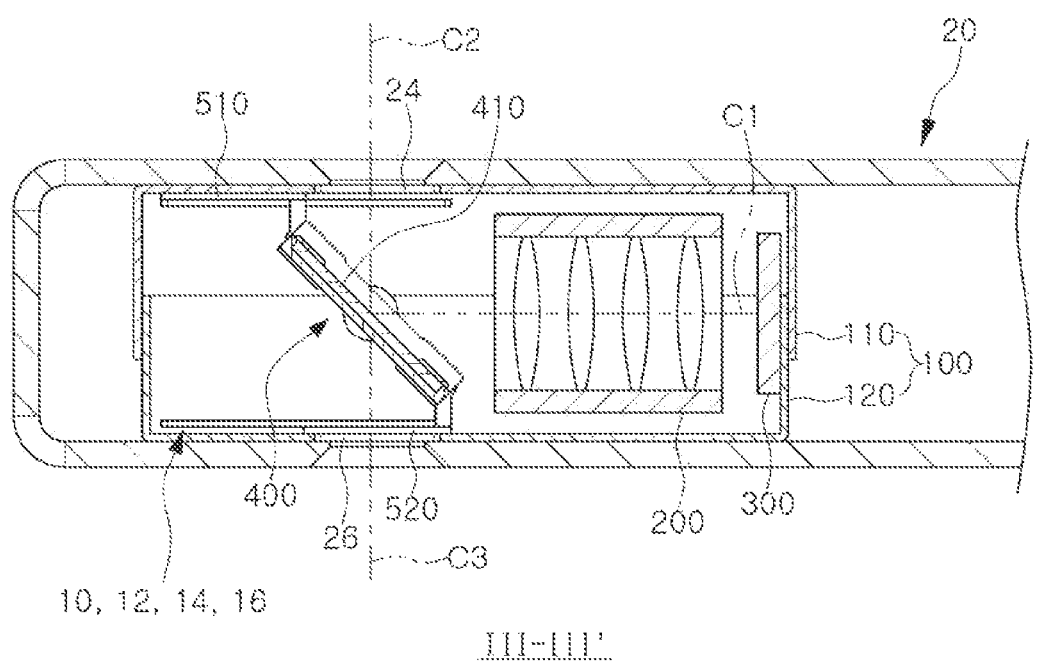
FIG. 15 is a cross-sectional view of the portable terminal illustrated in FIGS. 14A and 14B.

A portable terminal according to an example embodiment will be described with reference to FIGS. 14A, 14B, and 15.

A portable terminal 20 of the present example embodiment may include a camera module. For example, the portable terminal 20 may include at least one of the previously described camera modules 10, 12, 14, and 16. The portable terminal 20 may include a display 22 such as a liquid crystal display (LCD), organic light emitting diode (OLED), active-matrix organic light-emitting diode (AMOLED), and the like. The display 22 may exhibit a still image or a video image captured by the camera modules 10, 12, 14, and 16 or pre-captured still image or video image.

Incident windows 24 and 26 may be formed in the portable terminal 20. For example, a first incident window 24 may be formed on a front surface of the mobile terminal 20, and a second incident window 26 may be formed on a rear surface of the portable terminal 20. An optical path connected to the camera modules 10, 12, 14, and 16 through the incident windows 24 and 26 of the portable terminal 20 may be formed. For example, a second optical path C2 may be formed through the first incident window 24, and a third optical path C3 may be formed through the second incident window 26. Light incident to the camera modules 10, 12, 14, and 16 along the second optical path C2 and the third optical path C3 may selectively reach the image sensor 300 by the optical path converting member 410.

The incident windows 24 and 26 of the portable terminal 20 may be selectively closed by first and second light-blocking members 510 and 520. For example, the first incident window 24 may be closed by the first light-blocking member 510, and the second incident window 26 may be closed by the second light-blocking member 520.

The portable terminal 20 configured as described above may capture images of subjects located in a front and a rear of the mobile terminal 20 with a single lens module 200 and a single image sensor 300. Accordingly, the portable terminal 20 according to the present example embodiment can reduce a size of a space for mounting a front camera module and a rear camera module and thus is advantageous in miniaturization and slimming of the portable terminal 20. Further, as the portable terminal 20 according to the present example can perform functions of two camera modules with the one camera module, manufacturing costs of the portable terminal 20 can be reduced.

According to the aforementioned example embodiments, the present disclosure enables selective capture of an image of a subject located in a front and rear through a single lens module.

While specific example embodiments have been illustrated and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a lens module having a first optical path;
   an optical path converting component configured to reflect or refract light incident on a second optical path and a third optical path, intersecting the first optical path, to the lens module; and
   a light-blocking member connected to the optical path converting component and configured to block light incident along the second optical path or the third optical path.

2. The camera module of claim 1,
   wherein the optical path converting component is configured to rotate with respect to a point at which the first optical path and the second optical path or the first optical path and the third optical path intersect.

3. The camera module of claim 1, wherein the light-blocking member comprises a cylindrical body configured to be accommodated in the optical path converting component,
   wherein the cylindrical body is configured to rotate with respect to a point at which the first optical path and the second optical path intersect, and
   wherein an opening enabling light traveling along the second optical path or the third optical path to be incident is formed on a circumferential surface of the cylindrical body.

4. The camera module of claim 3, wherein a circumferential length of the opening is less than ½ of a circumferential length of the cylindrical body.

5. The camera module of claim 1, wherein the light-blocking member comprises:
   a first light-blocking member connected to an end of the optical path converting component and configured to selectively block light incident along the second optical path; and
   a second light-blocking member connected to an other end of the optical path converting component and configured to selectively block light incident along the third optical path.

6. The camera module of claim 5, wherein the optical path converting component comprises:
   an optical path converting member; and
   a support member for supporting the optical path converting member.

7. The camera module of claim 6, wherein a groove extending in a length direction of the optical path converting member is formed in the support member, and
   wherein an extension unit formed to bind to the groove is formed in the first and second light-blocking members.

8. The camera module of claim 1, further comprising a housing for accommodating the lens module and the optical path converting component.

9. The camera module of claim 8, wherein a guide groove for guiding a movement of the light-blocking member is formed in the housing.

10. The camera module of claim 9, further comprising a guide member inserted to the guide groove and guiding the movement of the light-blocking member.

11. The camera module of claim 8, wherein a window exposed toward the second and third optical paths is formed in the housing.

12. The camera module of claim 1, further comprising a first driving member configured to drive the optical path converting component.

13. The camera module of claim 1, further comprising a second driving member configured to move the lens module along the first optical path.

14. A portable terminal comprising the camera module of claim 1.

15. The portable terminal of claim 14, wherein the second optical path is incident to a front surface of the portable terminal and the third optical path is incident to a rear surface of the portable terminal.

16. A camera module, comprising:
   a lens module having a first optical path;
   an optical path converting component rotatable to change direction of light incident on a second optical path and a third optical path to the first optical path of the lens module; and
   a light-blocking member connected to the optical path converting component to selectively block the light incident on the second optical path and the third optical path in response to rotation of the optical path converting component.

17. The camera module of claim 16, wherein the light-blocking member rotates with the optical path converting component.

18. The camera module of claim 16, wherein the light-blocking member slides linearly with the rotation of the optical path converting component.

19. A portable terminal, comprising:
   a front surface and a rear surface;
   a lens module disposed between the front surface and the rear surface and having an optical path;
   an optical path converting component configured to rotate to change direction of light incident to the front surface and light incident to the rear surface to the optical path of the lens module; and
   a light-blocking member connected to the optical path converting component to selectively block the light incident to the front surface and the light incident to the rear surface.

20. The portable terminal of claim 19, wherein the light-blocking member slides linearly or rotates with the rotation of the optical path converting component to selectively block the light incident to the front surface and the light incident to the rear surface.

\* \* \* \* \*